UNITED STATES PATENT OFFICE.

WILLY SCHUMACHER, OF HÖCHST-ON-THE-MAIN, GERMANY, ASSIGNOR TO FARBWERKE VORM. MEISTER, LUCIUS & BRÜNING, OF HÖCHST-ON-THE-MAIN, GERMANY, A CORPORATION OF GERMANY.

ORTHO-OXY-MONOAZO DYE.

No. 846,511.  Specification of Letters Patent.  Patented March 12, 1907.

Application filed March 20, 1906. Serial No. 307,033.

*To all whom it may concern:*

Be it known that I, WILLY SCHUMACHER, Ph. D., chemist, a citizen of the United States of America, residing at Höchst-on-the-Main, Germany, have invented certain new and useful Improvements in the Manufacture of a new Ortho-Oxy-Monoazo Dyestuff, of which the following is a specification.

I have found that the ortho-oxy-monazo dyestuff representing the combination of the diazotized nitro-chlor-ortho-amino-phenol, ($NO_2$:Cl:$NH_2$:OH = 1:2:4:5,) which is a derivative of para-nitranilin and of para-chloro-phenol, with the 1.8-dioxy-3.6-disulfonic acid, is a very valuable dyestuff.

It may be produced, for instance, by allowing the diazotized nitro-chloro-aminophenol ($NO_2$:CL:$NH_2$:OH = 1:2:4:5) to act upon 1.8-dioxy-3.6.-naphthalene-disulfonic acid in presence of hydrate of lime. When separated from the acid solution, the dyestuff forms a dark bronze powder soluble in water with a red color. This solution becomes blue on addition of caustic alkali or sodium carbonate. In concentrated sulfuric acid the dye dissolves with a red-blue color. When heated with tin and hydrochloric acid, the dyestuff is reduced to oxy-chloro-para-phenylenediamin and amino-chromotropic acid. It dyes wool in an acid-bath red color, which turns a beautiful solid greenish blue when treated with chromates. Such a greenish-blue shade is also obtained by directly dyeing on chrome-mordanted wool.

The manufacture of the new dyestuff may be illustrated, for instance, as follows: 18.6 kilograms of nitro-chlor-amino-phenol ($NO_2$:Cl:$NH_2$:OH = 1:2:4:5) are diazotized with twenty-five kilograms hydrochloric acid of about 20° Baumé specific gravity and 6.9 kilograms nitrite and the diazo compound than added to a solution of thirty-eight kilograms of the disodium salt of the 1.8-dioxy 3.6-naphthalene-disulfonic acid stirred up with 25 kilograms of lime. After a few hours stirring it is filtered, the dissolved lime may be precipitated by soda, and the dyestuff is isolated from the solution by adding hydrochloric acid and common salt.

Having now described my invention, what I claim is—

As a new product the monoazo dyestuff which is the product of combination of diazotized nitro-chlor-ortho-aminophenol, being a derivative of paranitraniline and of para-chlorophenol, and of 1.8-dioxy-3.6-naphthalene-disulfonic acid, it is a dark powder of bronze luster, soluble in water with a red color, which turns blue on addition of caustic alkali or sodium carbonate, it dissolves in concentrated sulfuric acid with a red-blue color, on reduction by tin and hydrochloric acid the dyestuff forms oxy-chloro-para-phenylene-diamin. OH : Cl : $NH_2$ : $NH_2$ := 1:4:2:5 and amino-1.8-3.6-naphthalene-disulfonic acid; in an acid-bath it dyes wool red, this shade turns a beautiful fast greenish blue when treated with chromates, chrome-mordanted wool is also directly dyed such a greenish-blue shade.

In testimony that I claim the foregoing as my invention I have signed my name in presence of two subscribing witnesses.

WILLY SCHUMACHER.

Witnesses:
 JEAN GRUND,
 CARL GRUND.